Figure 1:
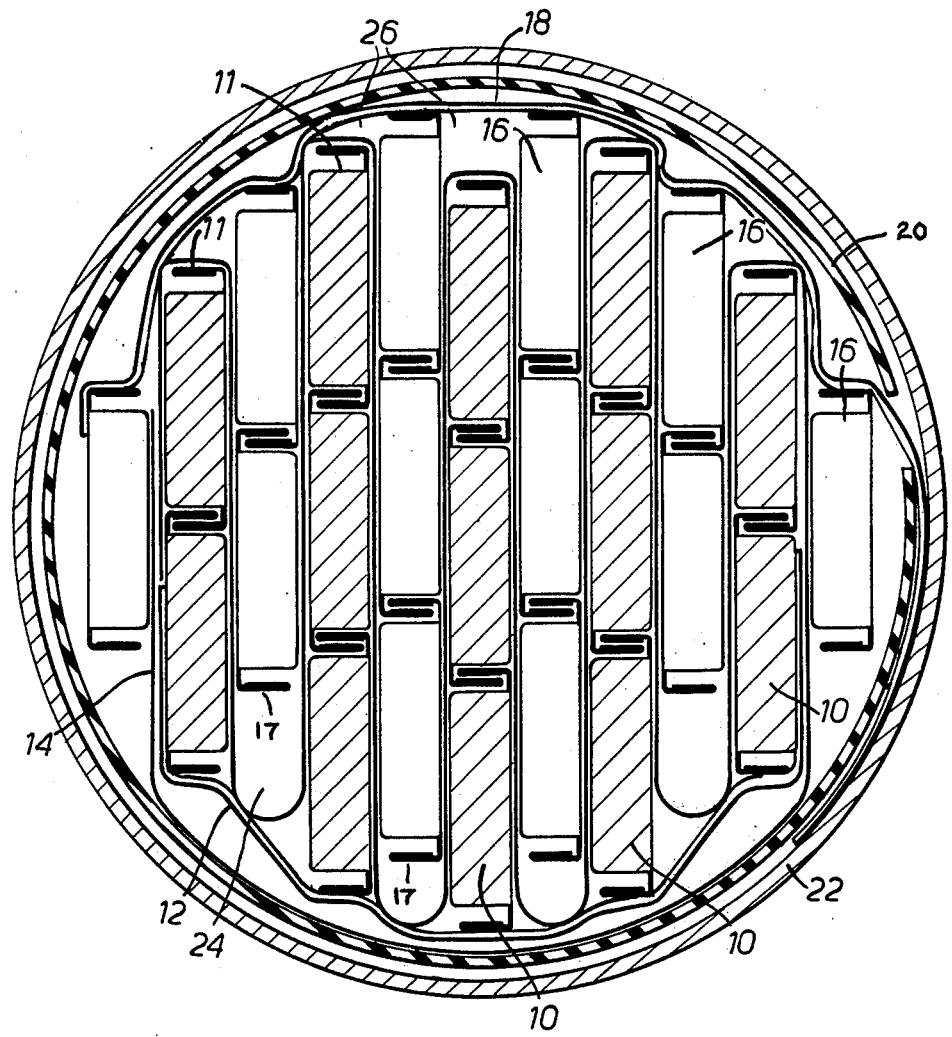

United States Patent [19]
White

[11] 3,969,140
[45] July 13, 1976

[54] ELECTRIC CELLS

[75] Inventor: Charles Arthur John White, Redditch, England

[73] Assignee: Chloride Alcad Limited, Redditch, England

[22] Filed: July 5, 1973

[21] Appl. No.: 376,375

[30] Foreign Application Priority Data
July 6, 1972 United Kingdom............... 31756/72

[52] U.S. Cl.................................. 136/14; 136/179
[51] Int. Cl.$^2$........................................ H01M 35/04
[58] Field of Search.................. 136/14, 13, 16, 20, 136/26, 24, 28, 69, 40, 134–135, 175, 176, 41, 62, 3, 179

[56] References Cited
UNITED STATES PATENTS

| | | | |
|---|---|---|---|
| 2,409,841 | 10/1946 | Donkin.................... | 136/134 R |
| 2,575,076 | 11/1951 | Smyth..................... | 136/135 R |
| 2,980,747 | 4/1961 | Daley...................... | 136/3 |
| 3,069,484 | 12/1962 | Hansen.................... | 136/3 |
| 3,245,837 | 4/1966 | Ikeda et al............... | 136/134 |
| 3,350,225 | 10/1967 | Seiger..................... | 136/13 X |
| 3,455,739 | 7/1969 | Field....................... | 136/13 X |
| 3,856,575 | 12/1974 | Hughes.................... | 136/14 X |

FOREIGN PATENTS OR APPLICATIONS

| | | | |
|---|---|---|---|
| 72,394 | 9/1916 | Austria.................... | 136/135 R |

Primary Examiner—Anthony Skapars
Attorney, Agent, or Firm—Watson, Cole, Grindle & Watson

[57] ABSTRACT

An electric storage cell, of gas-tight type, has flat rectangular positive and negative plates intercalated with one another in a cylindrical (or part-cylindrical) gas-tight casing, in parallel planes parallel to the axis. The outer plates are narrower than the middle ones (in a direction perpendicular to the axis) so that their edges are stepped to roughly follow the cylindrical shape of the casing, and are of pocket type with the active perforated area extending substantially to their edges, so that portions of plates projecting beyond their neighbors provide exposed active areas for recombination of gases evolved from neighboring plates. The plates are built up from standard pockets, each pocket extending parallel to the axis, so that the width of each plate is an integral multiple of the width of a pocket.

8 Claims, 2 Drawing Figures

ELECTRIC CELLS

This invention relates to electric storage cells of alkaline type having a gas-tight casing, and is concerned with the problem of preventing liberation of gases, or absorbing gases liberated, during the operation of the cell, so as to prevent build up of gas pressure which could damage or even burst the cell.

The term "gas-tight" is used herein in its normal sense as indicating that during normal use, both when charging and discharging, the cell has no venting means for release of gas at atmospheric pressure. The term is not intended to exclude the provision of a safety vave or other safety device which operates only in an emergency, nor is it intended to exclude a cell that is closed by a removable gas-tight plug or stopper, although normally a gas-tight cell would be sealed at the factory and intended to remain sealed throughout its life.

According to the present invention an electric storage cell, of gas-tight type, has flat rectangular positive and negative plates intercalated with one another in a cylindrical (or part-cylindrical) gas-tight casing, in parallel planes parallel to the axis, in which the outer plates are narrower than the middle ones (in a direction perpendicular to the axis) so that their edges are stepped to roughly follow the cylindrical shape of the casing, and are of pocket type with the active perforated area extending substantially to their edges, so that portions of plates projecting beyond their neighbours provide exposed active areas for recombination of gases evolved from neighbouring plates.

The plates may be separated in various ways, conveniently by separators formed from a strip of separator material folded zig-zag fashion around one corresponding edge of each plate of one polarity and the opposite corresponding edge of each plate of the other polarity.

The cell may be generally as described in the commonly assigned U.S. Pat. application Ser. No. 346,804, now U.S. Pat. No. 3,856,575, to Herbert O. Hughes, filed Apr. 2, 1973.

The arrangement is intended to operate in a manner similar to that described in the present applicants' British Pat. specification No. 1080992 in which the gas is intended to collect in gas cavities each of which is bounded partly by separator material and partly by a part of the surface of one of the plates. Preferably, as described in that specification, the quantity of electrolyte is sufficient to substantially saturate and be absorbed by the separator material while being distributed so that areas of the separator material in contact with plates of both polarities contain sufficient absorbed electrolyte to provide effective conduction, but there is substantially no free electrolyte present in the plates and separators so that areas exposed on at least one side to a cavity do not contain sufficient absorbed electrolyte to prevent the passage of gas through the separator.

In an arrangement in accordance with the invention the edges of at least some of the plates are stepped, with the edge of a wider plate projecting beyond the edge of a neighbouring narrower plate. The marginal portion of one face of such a projecting edge is accordingly exposed to a gas cavity either directly or through the separator material. Thus where the loop of separator material embraces the narrower plate it may terminate short of the wider plate so as to leave a portion of the edge of the latter exposed, while still providing within the loop a gas cavity exposed to the edge of the narrower plate. At the other edge where the wider plate is embraced by the loop of separator material the projecting marginal portion of the wider plate is exposed to a gas cavity through the separator material.

In any event where there is a loose loop of separator material not in contact with either plate such material tends to become drier than separator material having one or each side in contact with a plate, and allows the gas to pass through it more readily.

In one form of the invention the widths of certain of the plates are chosen so as not to fit closely within the cylindrical casing; in particular it may be convenient to employ some neighbouring plates of the same width. In this case the intercalation of such plates may be asymmetrical, so that at one or each edge they are not flush, and at least at one edge one plate projects beyond the other so as to expose both an edge and a marginal portion of its face. For example the plates of opposite polarity may be assembled together from opposite directions to a position short of a symmetrical position.

In a preferred arrangement the plates are built up from standard pockets, each pocket extending parallel to the axis, so that the width of each plate must be an integral multiple of the width of a pocket.

Figure 2:
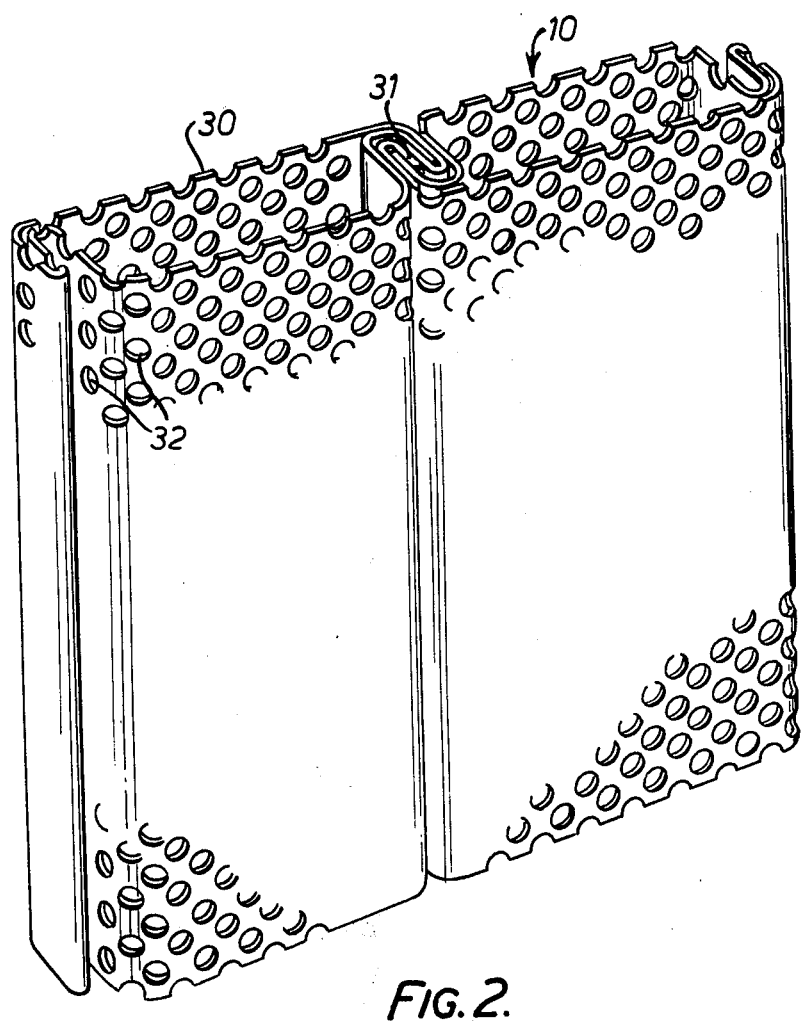

The present invention may be put into practice in various ways but one specific embodiment will now be briefly described by way of example with reference to the accompanying drawings in which:

FIG. 1 is a somewhat diagrammatic sectional plan view of an electric storage cell in accordance with the present invention, and FIG. 2 is a fragmentary perspective view of two adjacent pockets of a plate showing how they are crimped together and perforated.

The construction is generally as described in the companion application referred to above in that the plates 10 and 16 of each polarity are provided with a plate strap 12 or 18 of foil strip one passing circumferentially around and being welded to the corresponding edges of plates of one polarity and the other passing similarly around and being welded to the opposite edges of the plates of the other polarity. In this case the edges of plates that are welded to a plate strap may lie upon a substantially cylindrical surface, whilst some or all of the plates are narrower than would be required to bring their opposite edges to the same cylindrical surface. The plates may be manually intercalated by pressing against the edges which are welded to the plate straps until they approach the said cylindrical configuration, at which point the opposite edges will be spaced from the cylindrical surface so as to provide additional gas cavities.

Each plate is of pocket type built up from one or more pockets of standard width, and the pockets of a plate are arranged side-by-side with their lengths extending parallel to the axis in a cylindrical casing. In the specific embodiment there are five positive plates 10 comprising respectively two, three, three, three and two pockets intercalated with six negative plates 16 comprising respectively one, two, three, three, two and one pockets.

As shown in FIG. 2 the selvedges 31 of the steel strips 30 forming the pocket are folded so that when two or more pockets are assembled together they interlock to form a stable assembly and to provide electrical continuity between neighbouring pockets, but the plates are not provided with the steel frame normally used on pocket type plates and which encloses the vertical edges of the plate. The whole area of the plate is perforated as shown at 32, up to the selvedges of the pocket strip and up to the tops and bottoms which are bent over together to close the pocket, so that the areas of the plates extending right up to their edges can be regarded as being active from the point of view of diffusion of gases such as oxygen.

In assembling the element comprising the plates 10 and 16 and a strip of separator material 14 the first operation is to assemble the five positive plates 10 with one edge of each in a common plane, and to weld a connector strap 12 across the coplanar edges as described in the co-pending application referred to above. As described in that application the plates are mounted in a jig with the spacing between neighbouring middle plates less than that between neighbouring outer plates to allow for the inclination of the plate strap when the plates are adjusted to approximate to a cylindrical surface. A strip of plastics fabric separating material 14 is then wrapped around the positive plates 10 passing along the coplanar edges and being wrapped around the opposite edges and folded into the spaces between neighbouring plates.

The six negative plates 16 are correspondingly welded to their connecting strap 18 and are then meshed with the positive plates 10 and separator 14. The two middle negative plates, being of the same width as the three middle positive plates, are brought into register with them, whilst the outer plates remain retracted.

The complete element is then manipulated by finger pressure to a roughly cylindrical form. It is found that in this operation the connecting strap 12 tends slightly to withdraw the central positive plate, and the middle two negative plates terminate just short of being in register with the next two positive plates. The assembly is completed by fitting a shrink-on plastic sleeve 20 and placing the plates in a cylindrical container 22 in a conventional manner.

The result of this slightly inaccurate assembly of the plates is that parts of the face areas of the large and intermediate negative plates towards one edge are completely exposed, and, with the separator 14 over the adjacent edges of the positive plates 10 and the plastic sleeve 20, will define gas spaces 26. In addition, of course, substantially the whole of one face of each outer negative plate is exposed towards the plastic sleeve 20.

The meshing of the negative plates, with the separator already wrapped and folded into the positive plates, causes the separator material 14 to be drawn down firmly over the free edges 11 of the positive plates 10, but leaves an open loop 24 over the free edges 17 of the negative plates, even if these are accurately positioned. In practice, however, resulting from the inexact method of approximating a circular configuration, the positive and negative plates are never accurately aligned in register with each other, and this results in further freedom of the loop around the free edges of the negative plates. The loops thus formed are open at the top and bottom so as to provide unrestricted passage for the diffusion of oxygen around the negative plate edges in addition to any gas which may penetrate the separator itself.

Thus the arrangement affords a number of fully exposed parts of the negative plate surfaces providing the areas, of most effective gas recombination, in addition to a number of further negative plate areas within the separator loops 24 which constitute additional, although somewhat less effective, areas for recombination.

In a further embodiment the invention is applied to a two cell battery comprising two semicylindrical cells sharing a common cylindrical casing with a diametral partition, or having separate semicylindrical casings. In this case one edge of each plate may lie in a common plane with corresponding edges of the other plates, while at least some of their opposite edges are staggered as described above.

What I claim as my invention and desire to secure by Letters Patent is:

1. An electric storage cell of a gas-tight type comprising: a gas-tight casing being at least partially cylindrical in shape; a plurality of flat rectangular positive and negative plates intercalated with one another in said casing and arranged in planes parallel to the axis of said casing, some neighboring plates being of the same width, the outer ones of said plates being narrower than the middle ones of said plates in a direction perpendicular to said axis so that their edges are stepped and substantially follow said partially cylindrical shape of said casing, the intercalation of such plates being asymmetrical so that at least at one edge such plates are not flush and at least at one edge one of said plates projects beyond the other so as to expose both an edge and a marginal portion of its face, and each of said plates being made of an integral number of standard size pocket-type plate members, each pocket extending parallel to the axis, so that the width of each plate is an integral multiple of the width of a pocket, and said pocket members having active perforated areas extending substantially to their edges, so that portions of said plates projecting beyond plates adjacent thereto provide exposed active areas for enabling recombination of gases evolved from adjacent plates.

2. A cell as claimed in claim 1 wherein said plates are separated by separators formed from a strip of separator material folded in a zig-zag fashion around one corresponding edge of each plate of one polarity and the opposite corresponding edge of each plate of the other polarity.

3. A cell as claimed in claim 2 including a quantity of electrolyte sufficient to substantially saturate and be absorbed by the separator material while being distributed so that areas of the separator material in contact with plates of both polarities contain sufficient absorbed electrolyte to provide effective conduction, there being substantially no free electrolyte present in the plates and separators so that areas exposed on at least one side to a cavity do not contain sufficient absorbed electrolyte to prevent the passage of gas through the separator.

4. A cell as claimed in claim 1 wherein since the edges of at least some of the plates are stepped, the edge of a wider plate projects beyond the edge of a neighbouring narrower plate, so that a marginal portion of one face of the projecting edge is exposed to a gas cavity.

5. A cell as claimed in claim 4 further comprising separator material between said plates and a loop of said separator material embraces the narrower plate and terminates short of the adjacent wider plate so as to leave a portion of the edge of the latter exposed, while still providing within the loop a gas cavity exposed to the edge of the narrower plate.

6. A cell as claimed in claim 5 in which the other edge of the wider plate is embraced by a loop of separator material, the projecting marginal portion of the wider plate being exposed to a gas cavity through the separator material.

7. A cell as claimed in claim 1 wherein the widths of certain of said plates are spaced from said cylindrical casing.

8. A cell as claimed in claim 1 in which the plates of opposite polarity are assembled together from opposite directions to a position short of a symmetrical position.

\* \* \* \* \*